INVENTOR.
Niles F. Guichet
BY
Robert E. Strauss
Attorney

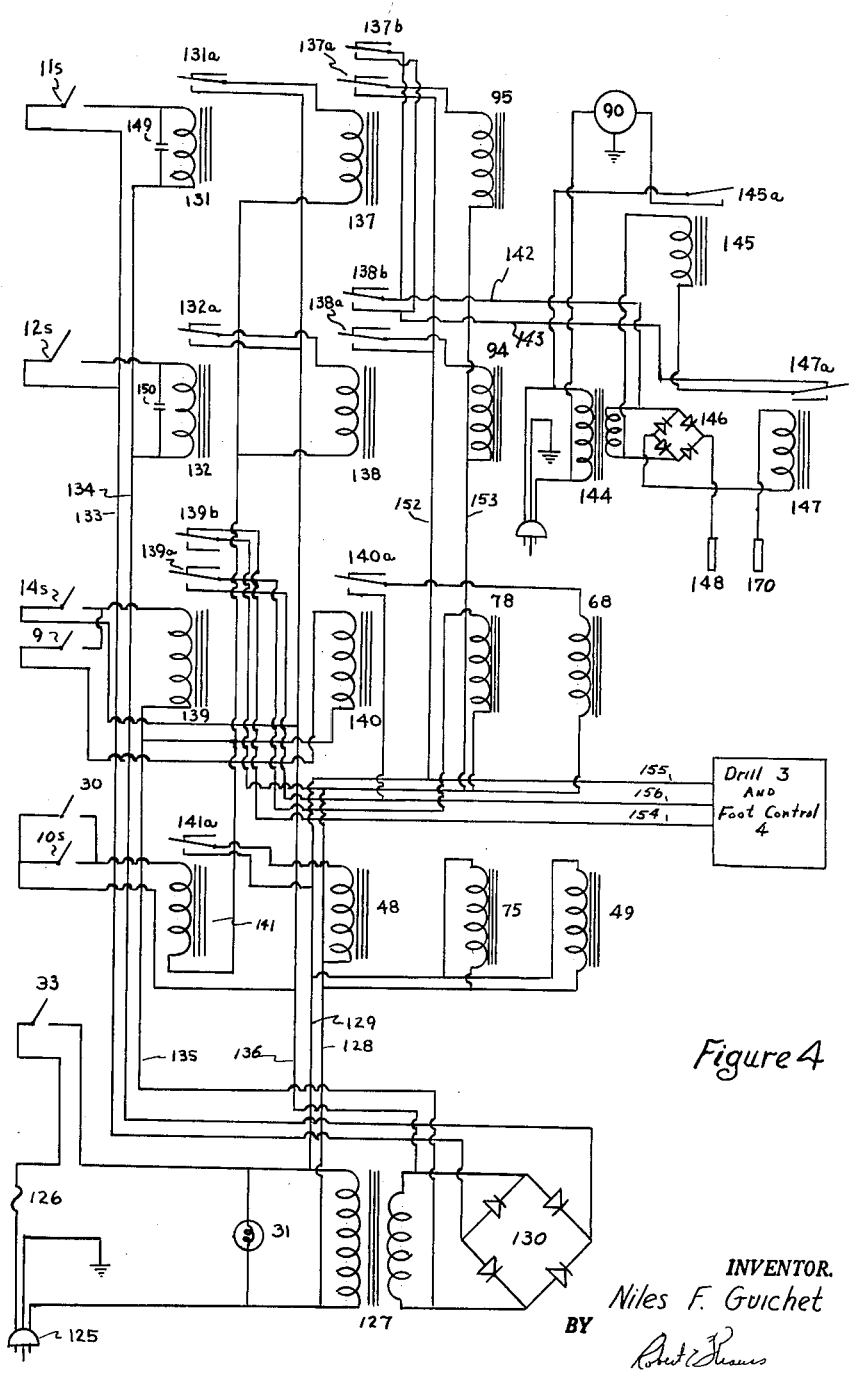

United States Patent Office 3,197,868
Patented Aug. 3, 1965

3,197,868
DENTAL INSTRUMENT UNIT
Niles F. Guichet, 320 Olympia Place, Anaheim, Calif.
Filed Sept. 5, 1961, Ser. No. 135,869
13 Claims. (Cl. 32—22)

This invention relates to an automatically controlled chairside dental evacuation system, to an assembly of dental instruments incorporating said evacuation system and to automatic control means to operate said instruments.

The efficiency of dental operations has been increased somewhat by recent innovations such as the chairside dental evacuation system of a hand held cuspidor cup and a large volume evacuator. These units are retractable into a chairside holder and are connected to a common vacuum source. Manually operated port valves are installed in the hand units to permit the patient and dentist to control the vacuum to the individual units. While this system eliminates the cumbersome cuspidor bowl and thereby permits free access to both sides of the patient, efficient operation is hindered by dependency on the patients' manipulation of the manual port valve in the cuspidor cup.

Additionally, the vacuum pump is operated continuously during the dental operation to avoid repeated manual switching of the power to the vacuum pump motor. The constant noise of the vacuum pump interferes with normal speech and is a disturbing element in the operation.

Heretofore, there have been no successful attempts to consolidate all the dental tools normally required by a dentist into a compact unit. As a result, the dentist performs many needless and time consuming efforts to obtain and replace the dental tools from their holders. Additionally, few of these tools have been equipped with automatic actuating means so that needless effort is also consumed in manual switching.

It is an object of this invention to provide a dependable means for automatically controlling the operation of a chairside evacuation system.

It is also an object of this invention to consolidate the dental tools needed by a dentist into a compact chairside assembly and thereby reduce the heretofore complex and inefficient movements of a dentist to simple arm and hand movements.

It is also an object of this invention to provide a dental tool holder having a microswitch assembly which provides an accurate and dependable response to the removal and return of dental instruments. Other objects and related purposes of my invention will be apparent from the following description of the drawings of which:

FIGURE 4 is a diagram of the electrical and control circuits of my invention.

Figure 1:
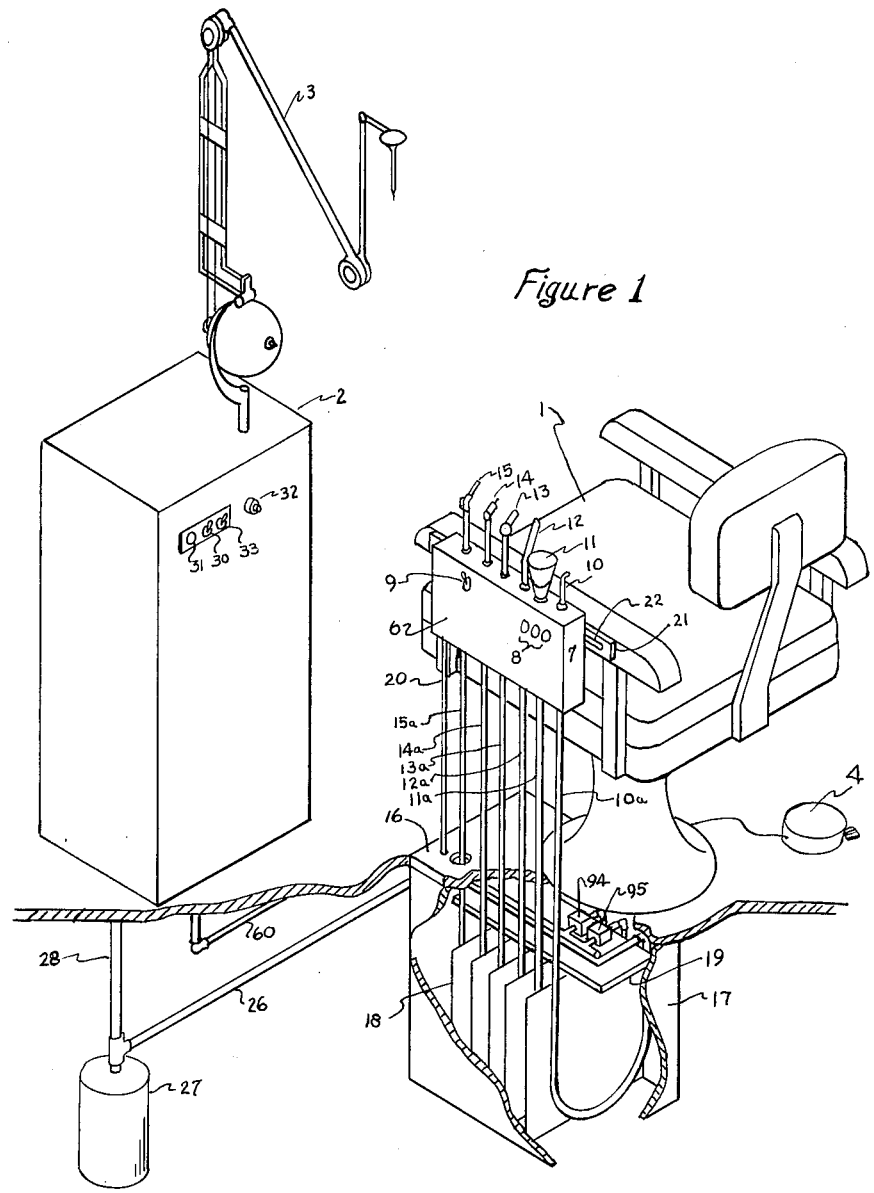
FIGURE 1 illustrates the chairside assembly of dental instruments and the adjacent stand housing the facilities for said instruments.

Referring now to FIGURE 1, there is illustrated a dental chair 1, and equipment housing 2 having a conventional belt driven drill 3 mounted on its upper cover and a foot operated control 4 for said drill. The dental instruments are retractably mounted in holders (hereinafter described in detail) on cover plate 5. A face plate 6 and end plates 7 are provided to complete the assembly which can conveniently be mounted on one side of the dental chair as illustrated. Preferably, the assembly is flexibly mounted to be displaced and thereby provide better access to the patient. As illustrated, the slide means comprises a track 22 in mounting bracket 21; however, other flexible supporting means such as flexible supporting arms, pivotable arms, etc., can be used. Call buttons 8 are provided on face plate 6 and a toggle switch 9 is mounted on face plate 6 to control the water supply to the turbine drill in a manner hereinafter described.

The assembly of retractable dental tools comprises a saliva ejector 10, a hand held cuspidor cup 11, a large volume oral evacuator 12, a heated air-water syringe 13 of conventional design having a heating element and valve means for air and water, such as a "Thermex" syringe manufactured by the Hanau Manufacturing Company, a turbine drill 14, such as the Borden Air Rotor, manufactured by the Borden Manufacturing Company, and a drinking syringe 15. Flexible lines comprising hose lines 10a, 11a, 12a, 13a, 14a and 15a and electrical wires 70 (shown in FIGURE 2) are connected to their respective instruments and pass downwardly through floor plate 16 into a well beneath the floor level. Electric cable 20 containing the wiring for the instrument control circuit also passes into this well. The well is formed by an open ended box 17 which is divided into compartments by transverse baffles 18. A plate 19 is laid on baffles 18 to provide a subfloor inside box 17 on which some of the control means are mounted. Solenoid valves 94 and 95 in the vacuum lines to instruments 12 and 11 respectively are illustrated; other control means which are positioned on the subfloor 19 are identified and described in the discussion of FIGURE 2.

The hose lines pass downwardly through separate compartments formed in box 17 by baffles 18. In box 17, these hose lines are looped and passed upwardly through their respective compartments to a point above plate 19 where they are connected to air, water and vacuum supply lines hereinafter described in reference to FIGURE 2. In most instances the weight of the hose is sufficient to return the instrument to its holder; however, it is within the scope of my invention to employ weights on pulleys for this purpose in a manner apaprent to those skilled in the art.

The flexible hose lines and control means within the well are connected to the dental tool motivating supply means comprising the air, water and vacuum supply facilities within housing 2 by piping beneath the floor. The vacuum line 60 to salvia ejector 10 is illustrated as well as the main vacuum line 26 to solenoids 94 and 95 and hose lines 11a and 12a. Vacuum line 26 is connected to a vertically disposed conduit 28 which extends to a vacuum source within housing 2. To prevent solids from clogging line 28, a sump 27 can conveniently be positioned beneath line 28. When desired, particularly when using a time delay, hereinafter described, sump 27 can be removed and the open ended T covered.

At a convenient location on housing 2 are mounted a master control switch 33 and indicator light 31. A water tap 32 is provided for supply of cool water needed for operations such as hydrocolloid impressions, etc. A toggle switch 30 is provided to operate the solenoid valve 48 in the water supply line to the aspirator of the salvia ejector and thereby permit circulation of water from tap 32 to the work area and return to the drain through the saliva ejector.

Completing the description of the unit as illustrated in FIGURE 1, means automatically responsive to the removal of turbine drill 14 from its holder are provided to permit the use of foot control 4 as an on-off control switch for the turbine drill.

Figure 2:
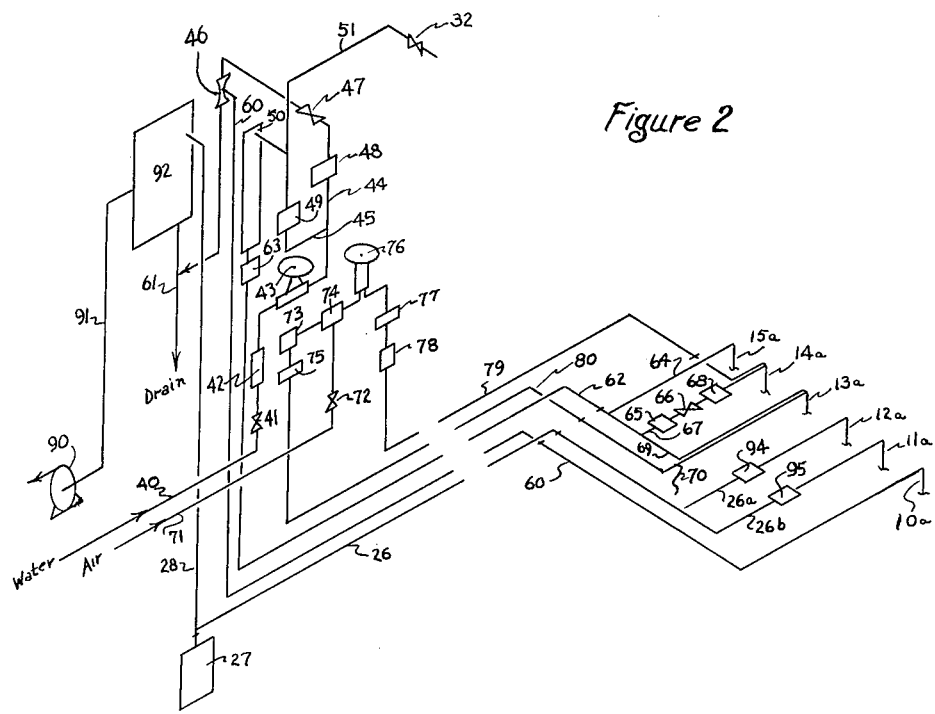
FIGURE 2 is a schematic diagram of the vacuum, air and water supply and control means for said instruments.

FIGURE 2 schematically illustrates the air, water and vacuum supply facilities which are connected to the dental instruments through their respective hose lines. The facilities at the left of this illustration are contained within housing 2, and the facilities to the right of FIGURE 2 are inside well 17, above plate 19. Connecting piping, lines 26, 60, 62, 79 and 80 are beneath the flooring.

The evacuation system of my invention comprises a vacuum source 90 which can be a central vacuum system in a building or, as shown, a vacuum pump. A main vacuum line 91 extends from the vacuum source into housing 2 to a conventional solids-liquid separator 92 having an automatically controlled drain and an emergency cut off to prevent solids and liquids from entering the vacuum line 91. Such a unit is commercially available from the Vacu Dent Manufacturing Company. Line 61 passes from separator 92 to the drain and previously mentioned line 28 extends from separator 92 to connect with main vacuum line 26 above sump 27. It is of course apparent that when the vacuum source has an integral solids-liquid separator, unit 92 can be eliminated. Main vacuum line 26 extends to well 17 and therein divides into vacuum branch lines 26a and 26b. Branch line 26a is coupled to hose line 12a and contains solenoid valve 94. Line 26b is coupled to hose line 11a and contains solenoid valve 95.

Referring now to the left of FIGURE 2, a water supply conduit 40 from the water main enters housing 2 and is fitted with a master valve 41, a solids strainer 42 having a mesh between about 100 and 350 mesh, preferably 200 mesh, and a water pressure regulating valve 43 which is set to automatically maintain the water pressure in the unit at a predetermined value despite fluctuations in the supply water pressure. Downstream of pressure regulating valve 43, the water line divides into lines 44 and 45.

Water line 44 passes to aspirator 46 which supplies a vacuum, through vacuum line 60 to hose line 10a of saliva ejector 10. A throttle control valve 47 is in line 44 to permit manual variation, when desired, of the water flow to aspirator 46 so as to obtain a variable degree of vacuum in line 60. The discharge from aspirator 46 is connected to drain line 61. A solenoid 48 controls the flow of water through line 44; this solenoid is automatically responsive to the removal of saliva ejector 10 from its seat in a manner hereinafter described.

Water line 45 contains a second solenoid valve 49, operated by master switch 33, and terminates at the inlet to water heater 50. Upstream from heater 50, water line 51 passes to water tap 32 previously described. The discharge of water heater 50 is connected to line 62 which passes to well 17 and contains a microfilter 63 to remove solid particles having diameters greater than about 50 to about 125 microns.

Within well 17, water line 62 divides into three lines. These are: line 64 which is directly coupled to hose 15a of drinking syringe 15; line 67 which is coupled to hose line 14a of turbine drill 14 and which contains microfilter 65, needle valve 66 and solenoid valve 68; and line 69 directly coupled to hose line 13a of the warm air and water syringe 13. Line 13a is a combined flexible hose line, containing separate passageways for water from line 69, air from line 80 and electrical wires 70 to the heating element in syringe 13. Electrical wires 70 are connected to a source of alternating current of line line voltage (115 v.) through a rheostat, not shown.

Referring now to the left of FIGURE 2, a compressed air supply line 71 enters housing 2 and has a manually operated master valve 72. Downstream of valve 72 is a water separator 74 which removes entrained water and moisture. An air line passes from separator 74 to an air pressure control valve 73 which maintains the air pressure constant at a predetermined setting. A solenoid valve 75 is placed downstream of valve 74 and is connected to air line 80. This air line passes beneath the flooring to well 17 and is therein connected to the air passageway of hose 13a.

A second air line passes from separator 74 to a valve and microfilter 76. This unit contains a needle valve for flow control and a solids filter to remove solid particles having diameters greater than about 25 microns. The discharge from valve-filter 76 is connected to an air pressure control valve 77 which maintains the air pressure constant at a predetermined setting. A solenoid valve 78 is placed downstream of valve 77 and connected to line 79 which passes beneath the flooring to well 17 and is therein connected to the air passageway in hose line 14a.

Figure 3:
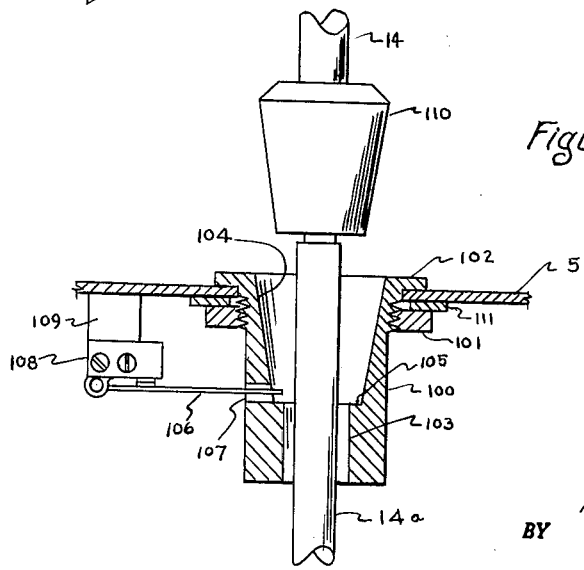
FIGURE 3 illustrates the dental tool holder and microswitch assembly.

Referring now to FIGURE 3, there is illustrated the tool holder and microswitch assembly of my invention which provides reliable control of the dental tools. As shown, top plate 5 of the chairside assembly is bored and a sleeve 100 is fitted into the hole and held securely in place by retaining means such as washer 111 and retaining nut 101 which engages threads provided on the upper outer periphery of sleeve 100. The upper edge of sleeve 100 has protruding lip 102 to lock securely against cover plate 5. Sleeve 100 also has a central bore 103 sized sufficiently large to accommodate the fluid hose lines such as 10a, 11a, 12a, 13a, 14a and 15a without binding. The upper portion of sleeve 100 contains a recess 104 having a diameter greater than that of central bore 103 so as to provide a shoulder 105. Immediately above shoulder 105 is positioned a microswitch actuating means which, in FIGURE 3, comprises lever 106 extending through radial bore 107 to microswitch means 108. The microswitch is securely mounted by bracket 109 to cover plate 5. The microswitch herein depicted is a simplified version having contacts spring biased to a closed position; however other conventional switches, e.g. "Subminiature" switches of the Minneapolis-Honeywell Co., suitably mounted, can be employed in a similar manner. As apparent to those skilled in the art, suitable mounting means could also be used to mount switch 108 to sleeve 100 rather than plate 5.

Tool 14 is fitted with an adapter or seat 110 having a diameter closely matching that of recess 104. Preferably, as illustrated in FIGURE 3, adapter 110 and recess 104 are tapered, the adapter being an inverted frustro-conical shape. In practice, this shape has provided more reliable and positive seating of the dental tool and actuation of microswitch 108. The matching tapered adapter and recess are also advantageous for prolonged use, as wear on their engaging surfaces does not loosen the fit of the tool in the holder such as would be experienced with cylindrical adapter and recess. Preferably all edges of recess 104 and central bore 103 are rounded to prevent fraying of the hose line.

The positioning of microswitch lever 106 immediately above shoulder 105 protects this lever from accidental contact by the hose line and thereby assures uninterrupted operation of the dental tool. This feature is an important element of my invention, since in the absence of shoulder 105, the flexible hose would readily engage the microswitch lever during manipulation of the dental tool.

FIGURE 4 illustrates the wiring and control circuit of my invention. Conventional alternating current line voltage is supplied at plug 125 shown at the lower left of the diagram. A fuse 126, master control switch 33, and indicator light 31 are in the line supply circuit to the primary windings of transformer 127. Lines 128 and 129 supply line voltage to the vacuum motor 90, belt driven drill 3 with its associated foot control 4, and solenoids 94, 95, 48, 49, 75, 78, 68, in a manner hereinafter described. A conventional loop rectifier circuit 130 is connected to the secondary windings of transformer 127 to supply a low voltage suitably 24 volts, direct current to relays 131 and 132 at the upper left of the diagram by lines 133 and 134. Relays 131 and 132 actuate relays 137 and 138 which, in turn, actuate solenoids 95 and 94 respectively and vacuum motor 90. Low voltage direct current is supplied to relays 131 and 132 by closing of microswitches 11s and 12s respectively. These microswitches are beneath cover plate 5 and have an actuating lever extending into the tapered seats for the hand held cuspidor cup 11 and large volume oral evacuator 12 in the manner shown by FIGURE 3. Condensers 149 and 150 are provided across the coils of relays 131 and 132. These condensers will maintain current flow through the relay coils for about 0.1 to about 30 seconds after the microswitches 11s and 12s are opened by return of their respective instruments to the holder. Suitable condensers have capacities between about 60 and 100 mf. The time delay achieved with these condensers will continue operation of the vacuum motor for a time period, preferably about 1 to 7 seconds after replacement of the cuspidor cup or oral evacuator. This delay will clear lines 26 and 28 of solids. This feature can be used in lieu of or in combination with sump 27.

The secondary winding of transformer 127 is tapped by lines 135 and 136 to supply a low voltage alternating current to the remaining relays 137, 138, 139, 140 and 141, in the primary control circuit. Closure of microswitch 11s causes the normally open contacts 131a of relay 131 to close and complete the circuit supplying the low voltage alternating current to relay 137 from lines 135 and 136. In a similar manner, microswitch 12s supplies current to relay 138. Relays 137 and 138 have two sets of normally open contacts, 137a, 137b, 138a and 138b. Contacts 137b and 138b are in parallel so that closure of either contacts will complete the circuit in lines 142 and 143 and supply low voltage alternating current from the secondary winding of transformer 144 to relay 145 in the vacuum unit control circuit to the right of the diagram.

In this control circuit, contacts 145a complete the circuit supplying line voltage alternating current to the vacuum motor. A rectifier 146 and low voltage direct current relay 147 are connected to electrodes 148 and 149. Contacts 147a are normally closed, however, when electrodes 148 and 170 are immersed in a liquid, which occurs when danger of liquid entrainment in vacuum line 91 exists, contacts 147a open and the vacuum motor stops. The liquid trap is thereupon cleaned to remove liquid from vessel surrounding the electrodes.

Contacts 137a and 138a complete the circuit between lines 152 and 153 supplying line voltage to normally closed solenoids 95 and 94 respectively which control the vacuum to the vacuum cuspidor cup 11 and oral evacuator 12.

Removal of turbine drill 14 from its seat closes microswitch 14s and supplies low voltage alternating current to relay 139. Normally closed contacts 139b are in the circuit supplying line voltage to foot control 4 and the motor of belt driven drill 3. These contacts open when microswitch 14s is closed to disconnect foot control 4 from the motor of the belt driven drill.

Normally open contacts 139a are in a circuit supplying line voltage to normally closed solenoids 78 and 68 which control the air and water supplies respectively, to the turbine drill 14. To permit the turbine drill 14 to be actuated by foot control switch 4, this switch is serially connected with contacts 139a in the circuit through lines 155 and 156.

Normally open contacts 140a of relay 140 are provided in the line voltage supply circuit to solenoid 68. Relay 140 is actuated by closure of microswitch 14s and toggle switch 9 which supply low voltage alternating current thereto. In this manner toggle switch 9 can be used to open the circuit supplying line voltage to solenoid 68 and permit operation of turbine drill 14 with air alone.

Relay 141 is actuated by the supply of low voltage alternating current through microswitch 10s which is closed by removal of saliva ejector 10 from its recess. This closes contacts 141a and supplies line voltage to solenoid 48 to operate aspirator 46 and supply a vacuum to the saliva ejector. To permit use of saliva ejector 10 while it is seated in its recess, as for instance, when it is desired to circulate a stream of water from water tap 30 during the taking of hydrocolloid impressions, toggle switch 30 is provided to open solenoid 48.

The remaining sloenoids 75 and 49 are opened by master control switch 33.

The operation of my dental unit is apparent from the preceding description. Removal of saliva ejector 10 from its recess closes microswitch 10s which through relay 141 opens solenoid 48 in water line 44 and provides a vacuum in line 60 to hose line 10a. The vacuum so supplied remains constant despite fluctuations in the water supply pressure because of pressure control valve 43.

When the patient removes the vacuum cuspidor cup 11 from its recess to expell solids and liquids from his mouth, microswitch 11s closes the circuit supplying current to the vacuum motor and opens solenoid valve 95. Upon release, the vacuum cup returns to its seat and opens microswitch 11s. This closes valve 95 and opens the circuit to the vacuum motor. When a time delay is desired, condenser 149 is coupled in the control circuit to retain solenoid 95 open and vacuum motor 90 in operation for several seconds to clear vacuum lines 26 and 28 of solids and liquid. As previously mentioned, use of time delay 149 can be alternative to solids sump 27 or supplemental thereto to insure against any danger of clogging the vacuum lines.

Sump 27 is provided at the base of vertically positioned vacuum line 28 so that any solids which fail to reach separator 92 during operation of the unit will fall into this sump.

The removal of oral evacuator 12 from its recess by the dental assistant or dentist similarly operates vacuum motor 90 and solenoid 94.

Air and water syringe 13 having manually operated valves is operated in a conventional manner by the dentist. The supply of water and air pressure to this unit, however, is controlled by master switch 33 and solenoids 49 and 75 respectively.

When turbine drill 14 is seated within its recess, microswitch 14s is open and foot control 4 is used in a conventional manner to control the motor of belt driven drill 3. Removal of turbine drill 14 from its recess will close microswitch 14s and thereby open contacts 139b, disconnecting foot control 4 from drill 3. Contacts 139a are closed by removal of turbine drill 14 thereby permitting actuation of solenoid 78 by foot control 4 to supply air to the drill. Closing toggle switch 9 closes contacts 140a to permit the simultaneous actuation of solenoid 68 and supply of water to the drill. The turbine drill automatically returns to its recess upon release and opens its microswitch to again permit operation of drill 3 by foot control 4.

The preceding description and illustration of my invention has been directed to a preferred embodiment of the invention and is not to be unduly limiting thereof, various changes in construction and substitution of equivalent parts as will readily occur to those skilled in the art being considered to be within the scope of the following claims.

I claim:

1. In a dental evacuation system, the combination of a holder, a retractable cuspidor cup means and a retractable oral evacuation means removably mounted upon said holder, a first flexible hose coupled to said retractable cuspidor cup means, a second flexible hose coupled to said retractable oral evacuation means, a first vacuum branch line and second vacuum branch line, said vacuum branch lines connecting said first and second flexible hoses to said main vacuum line, a vacuum supply means connected to said main vacuum line, first normally closed valve means in said first vacuum branch line, second normally closed valve means in said second vacuum branch line, and control means for each of said valves, said control means being responsive to the removal of said retractable cuspidor cup means and said retractable oral evacuation means from said holder to open respectively said first valve means and said second valve means.

2. The combination of claim 1 including a sump means in said main vacuum line.

3. The combination of claim 2 wherein said main vacuum line has a vertically disposed section and said sump means is connected to said main vacuum line beneath said vertical section.

4. The combination of claim 1 including a solids, liquid and gas separating means in said main vacuum line.

5. The combination of claim 1 including a control means for said vacuum supply means which is responsive to the removal, from said holder, of said retractable cuspidor cup means and said retractable oral evacuation means to supply a vacuum from said vacuum supply means to said main vacuum line, said control means also being responsive to the return, to said holder, of said retractable cuspidor cup means and said oral evacuation means to discontinue the supply of said vacuum from said vacuum supply means.

6. The combination of claim 5 wherein said control means include a time delay to retain said valves open and said vacuum supply means engaged for a time interval of 0.1 to about 30 seconds after the return of said retractable means to said holder.

7. The combination of claim 1 including a retractable turbine drill removably mounted on said holder, a third flexible hose coupled to said turbine drill, said third flexible hose having two separate fluid pasageways; a water supply means coupled to one of said fluid passageways and a third normally closed valve means in said water supply line; an air supply line to the second of said fluid passageways and a fourth normally closed valve means in said air supply line and control means to open said third and fourth valve means upon the removal of said turbine drill from said holder and to close said third and fourth valve means upon the return of said turbine drill to said holder.

8. In a dental unit, the combination of a dental tool, a dental tool holder, dental tool motivating supply means and a microswitch, said tool holder comprising a sleeve having a central bore and a seat positioned thereabove, said seat having a frustro-conical shape with a mouth and a base, the dimeter of said base of said seat being greater than the diameter of said central bore to form a shoulder at the junction of said bore and said seat, an adapter on said dental tool having a frustro-conical shape that matches the shape of said seat, the diameter of the lower face of said adapter being of substantially lesser diameter than said mouth of said seat to thereby facilitate the return of said tool to said holder, a flexible line connecting said motivating supply means to said dental tool, said flexible line extending through said central bore and attached to said dental tool beneath said adapter to permit said tool to fit into said seat, and microswitch actuating means in said seat, above said shoulder and in the path of travel of said, adapter when said tool is removed from and replaced in said holder, said microswitch adapted to activate said dental tool motivating supply means when said tool is removed from said holder and to deactivate said dental tool motivating supply means when said tool is replaced in said holder.

9. A dental instrument assembly and holder therefore having instrument actuating means automatically responsive to the removal of said instruments comprising: a retractable cuspidor cup means, a retractable oral evacuation means, a retractable air and water syringe and a retractable turbine drill; a first flexible hose coupled to said retractable cuspidor cup means, a second flexible hose coupled to said retractable oral evacuation means, a third flexible hose coupled to said air and water syringe and a fourth flexible hose coupled to said turbine drill, said third and fourth flexible hoses each having two separate fluid passages; a main vacuum supply line, first and second vacuum branch lines coupling said first and second flexible hoses, respectively, to said main vacuum line and first and second normally closed valve means in said first and second vacuum branch lines; a first water supply line coupled to one of said fluid passageways of said third flexible hose, a second water supply line coupled to one of said fluid passageways of said fourth flexible hose and a third normally closed valve means in said second water supply line; a first air supply line to the second of said fluid passageways in said third hose, a second air supply line to the second fluid passageway of said fourth hose and fourth normally closed valve means in said second air supply line; said instrument holder comprising a plate bearing first, second, third and fourth sleeve means, each of said sleeve means having a central passageway for said first, second, third and fourth hose means respectively, and seat means positioned above each of said central passageways in said sleeves, said seat means having greater diameters than said central passageways to form shoulders therebetween; adapter means mounted on said cuspidor cup means, on said oral evacuation means, on said syringe and on said turbine drill, said adapter means matching said seat means and positioned so as to seat therein; switch actuating means in said first, second and fourth seats above the shoulders in said seats and in the path of travel of said adapters when said instruments are removed from and replaced into said holder, said switch actuating means in said first and second seat means being operative to engage said vacuum supply means and open said first and second valve means respectively, upon the removal of said cup means and said evacuation means; said switch actuating means in said fourth seat means being operative to open said third and fourth valve means, upon the removal of said turbine drill from said holder, and a toggle switch mounted on said holder to disconnect said switch means in said fourth seat from said fourth valve means.

10. The instrument assembly of claim 9 including a saliva ejector, a fifth flexible hose coupled thereto, a vacuum supply line connecting said hose to an aspirator, a third water supply line to said aspirator, a pressure control valve set to maintain a predetermined pressure in said third water supply line, a flow control valve and a fifth normally closed valve means in said third water line, a fifth sleeve and seat in said holder, an adapter on said saliva ejector to match said seat, and switch actuating means in said fifth seat operative to open said fifth valve means.

11. The instrument assembly of claim 10 including a drinking water syringe, a sixth sleeve and seat in said holder, an adapter on said syringe matching said seat, a sixth flexible hose passing through said sixth sleeve and coupled to said syringe and a fourth water supply line to said sixth hose.

12. The instrument assembly of claim 9 wherein said seat means are tapered recesses and said adapters have a frustro-conical shape with a taper matching that of said seat means.

13. The instrument assembly of claim 9 including a mounting bracket attached to said holder to movably mount said assembly on a dental chair.

References Cited by the Examiner
UNITED STATES PATENTS

| 533,445 | 2/95 | Denison | 32—22 |
| 2,924,880 | 2/60 | Ziegler et al. | 32—28 |
| 3,031,760 | 5/62 | Bender | 32—3¹ |

RICHARD A. GAUDET, *Primary Examiner.*

ROBERT E. MORGAN, *Examiner.*